(12) United States Patent
Campbell et al.

(10) Patent No.: US 7,092,906 B1
(45) Date of Patent: Aug. 15, 2006

(54) PARALLEL KEYSTREAM DECODER

(75) Inventors: Scott J. Campbell, Frederick, CO (US); Thomas E. Fischaber, Golden, CO (US)

(73) Assignee: Xilinx, Inc., San Jose, CA (US)

( * ) Notice: Subject to any disclaimer, the term of this patent is extended or adjusted under 35 U.S.C. 154(b) by 146 days.

(21) Appl. No.: 10/799,183

(22) Filed: Mar. 12, 2004

(51) Int. Cl.
*G06F 17/00* (2006.01)

(52) U.S. Cl. ............................. 705/50; 705/51; 705/57
(58) Field of Classification Search .............. 713/200, 713/201, 171; 705/50, 51, 57; 380/255, 380/37
See application file for complete search history.

(56) References Cited

U.S. PATENT DOCUMENTS 4,897,876 A * 1/1990 Davies ....................... 380/43
5,631,960 A * 5/1997 Likens et al. ................. 380/2
5,757,909 A * 5/1998 Park ........................... 380/201
6,578,150 B1 * 6/2003 Luyster ...................... 713/200

FOREIGN PATENT DOCUMENTS

JP 363039229 A * 2/1988
JP 408023331 A * 1/1996

* cited by examiner

*Primary Examiner*—Elisca Pierre Eddy
(74) *Attorney, Agent, or Firm*—LeRoy D. Maunu (57) ABSTRACT

Methods and circuitry are disclosed for decoding a keystream. A set of test bits is generated, and a set of attempted keystream bits are generated from differences between the test bits and an input set of cipher bits. A set of current keystream bits are generated from a current seed using a parallel feedback shift register, and the attempted keystream bits are compared to the current keystream bits. In response to attempted keystream bits being equal to the current keystream bits, the current keystream bits are fed back as a new current seed. In response to attempted keystream bits being not equal to the current keystream bits, the attempted keystream bits are fed back as the new current seed.

18 Claims, 6 Drawing Sheets

PARALLEL KEYSTREAM DECODER

FIELD OF THE INVENTION

The present invention generally relates to keystream decoders.

BACKGROUND

Encryption-based data transmission schemes generally encode data using a random key. The original data may be referred to as plain text, the encryption key referred to as the keystream, and the resulting encrypted data referred to as the cipher text. The terms bits will sometimes be used in place of text in this description to indicate the binary representation of the text.

A transmitter encodes data using a selected keystream, and a receiver decodes the data using the same keystream. In some applications the receiver may be initially unaware of the keystream used by the transmitter. In these applications, the receiver applies different keystreams to received cipher text until the cipher text is successfully decoded. The keystream may be determined from a training pattern that is sent by the transmitter and known to the receiver. Once the receiver has decoded the cipher text using a keystream and recognized the training pattern, the receiver is said to have locked onto the training pattern. Thereafter, that keystream provides the seed for subsequently generated keystreams.

Serial encryption circuitry is often implemented with a linear feedback shift register (LFSR) that generates a serially output keystream. The cipher text may be generated by applying an exclusive-or function to the bits of plain text in combination with bits of the keystream. The output bits of the keystream are also fed back as input to the first stage of the LFSR.

For an LFSR having n stages and that implements a complete sequence, the maximum time that a receiver may expend in locking onto the training pattern is $2^n-1$ cycles. For large keystreams this may be a performance issue.

With increasing speeds and increasing numbers of configurable resources, field programmable gate arrays (FPGAs) are becoming the device of choice to implement various application circuitry. However, an FPGA may be unsuitable to host a serial LFSR that is to operate at very high frequencies. Even though an FPGA may be unable to implement an LFSR operating at some highest clock-rate, the speed limitations of the FPGA may be ameliorated by multiplexing the LFSR output into a parallel representation.

One method of multiplexing the serial LFSR sequence into a parallel sequence is to clock the serial LFSR at a high rate, and then perform a serial to parallel conversion to the slower rate parallel version. This process is reversed to demultiplex the low-speed parallel version into the higher-rate serial sequence. This process may be expensive in terms of resources because it requires logic for both the serial LFSR and the serial to parallel conversion.

The serial to parallel conversion of an LFSR sequence may result in a number of possible variations of the encoded training pattern since the keystream may vary according to the time at which the serial keystream is parallelized. The possible variations in the parallel form of the training pattern may require many cycles for the decoder to lock on the training pattern because the decoder must attempt different keystreams with the variations in the training pattern.

The present invention may address one or more of the above issues.

SUMMARY OF THE INVENTION

The various embodiments of the invention support decoding a keystream. In one set of embodiments, a set of test bits is generated, and a set of attempted keystream bits are generated from differences between the test bits and an input set of cipher bits. A set of current keystream bits are generated from a current seed using a parallel feedback shift register, and the attempted keystream bits are compared to the current keystream bits. In response to attempted keystream bits being equal to the current keystream bits, the current keystream bits are fed back as a new current seed. In response to attempted keystream bits being not equal to the current keystream bits, the attempted keystream bits are fed back as the new current seed.

In another embodiment, decoder circuit is disclosed for decoding a keystream. A first circuit is configured to generate a set of test bits. A second circuit is coupled to the first circuit and is configured to generate a set of attempted keystream bits from differences between the test bits and an input set of cipher bits. A parallel feedback shift register (PFSR) generates a set of current keystream bits from a current seed, and a third circuit compares the attempted keystream bits to the current keystream bits. A fourth circuit is coupled to the third circuit and is configured to feed back the current keystream bits as a new current seed in response to attempted keystream bits that equal the current keystream bits. In response to attempted keystream bits being not equal to the current keystream bits, the fourth circuit feeds back the attempted keystream bits as a new current seed.

In yet another embodiment, a parallel feedback shift register is disclosed. A plurality of single-bit registers are implemented in a field programmable gate array (FPGA). A plurality of function generators in the FPGA have output ports coupled to the registers. Input ports of each of the function generators are coupled to output ports of at least two of the registers. Each function generator is configured to apply an exclusive-or function to signals at the input ports, and each register is updated with a new state in response to output from the coupled function generator.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

The various embodiments of the present invention decode a keystream in parallel. Test pattern bits are generated and compared in parallel to input cipher bits, and the result of that comparison, referred to as the attempted keystream, is compared to a current keystream. A parallel-feedback shift register (PFSR) generates the current keystream bits in parallel. The feedback to the PFSR is based on either the value of the current keystream or the attempted keystream, depending on whether the current keystream matches the attempted keystream. Once the two keystreams match, the current keystream is used for feedback. Otherwise the attempted keystream is used for feedback.

Figure 1:
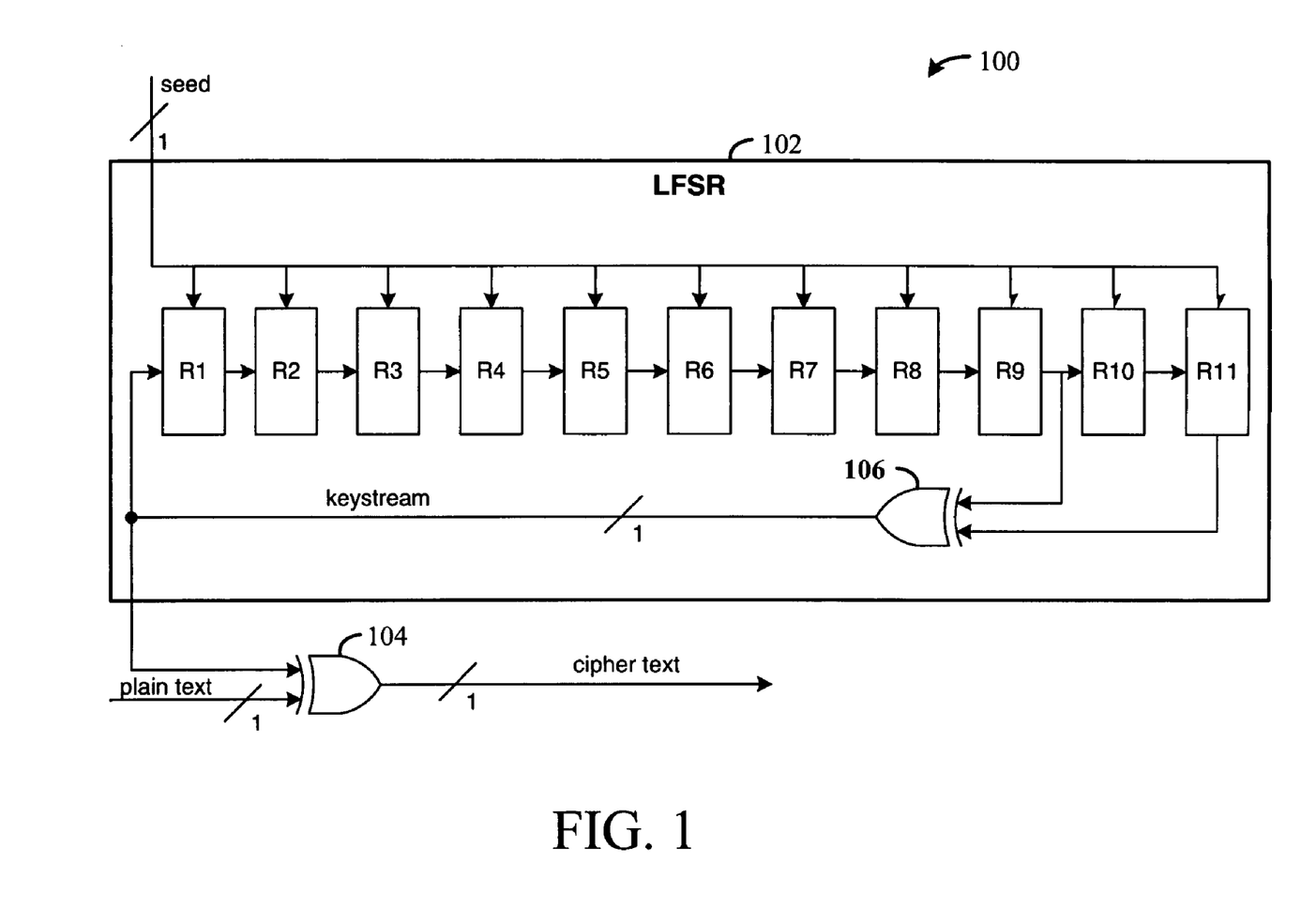
FIG. 1 illustrates an example serial stream cipher.

FIG. 1 illustrates an example serial stream cipher 100. A serial stream cipher generally includes two components, a linear feedback shift register (LFSR) 102 and an encryption unit, which in the example cipher is exclusive-or (XOR) gate 104.

LFSRs include a sequence of registers, for example, R1–R11, and one or more XOR gates, for example XOR gate 106. The output stream of bits from the LFSR is a pseudo-random code sequence, and the output bits are fed back as input to the first stage of the LFSR (R1). Varying the location and number of the XOR gates may change the sequence. The registers that are chosen for input of bits to the XOR gate(s) are referred to as taps. In LFSR 102, taps are taken from R9 and R11.

A maximum length LFSR is generally defined as an LFSR that will output the maximum possible number of different keystreams before the sequence is repeated. For example, the maximum number of unique 11-bit keystreams from an 11-bit LFSR is $2^{11}-1$ (where all 0 bits are not allowed).

The encryption unit of a serial stream cipher may be as simple as applying an XOR function to the keystream bits in combination with the plain text bits (XOR gate 104). The output from the encryption unit is the cipher text.

Figure 2:
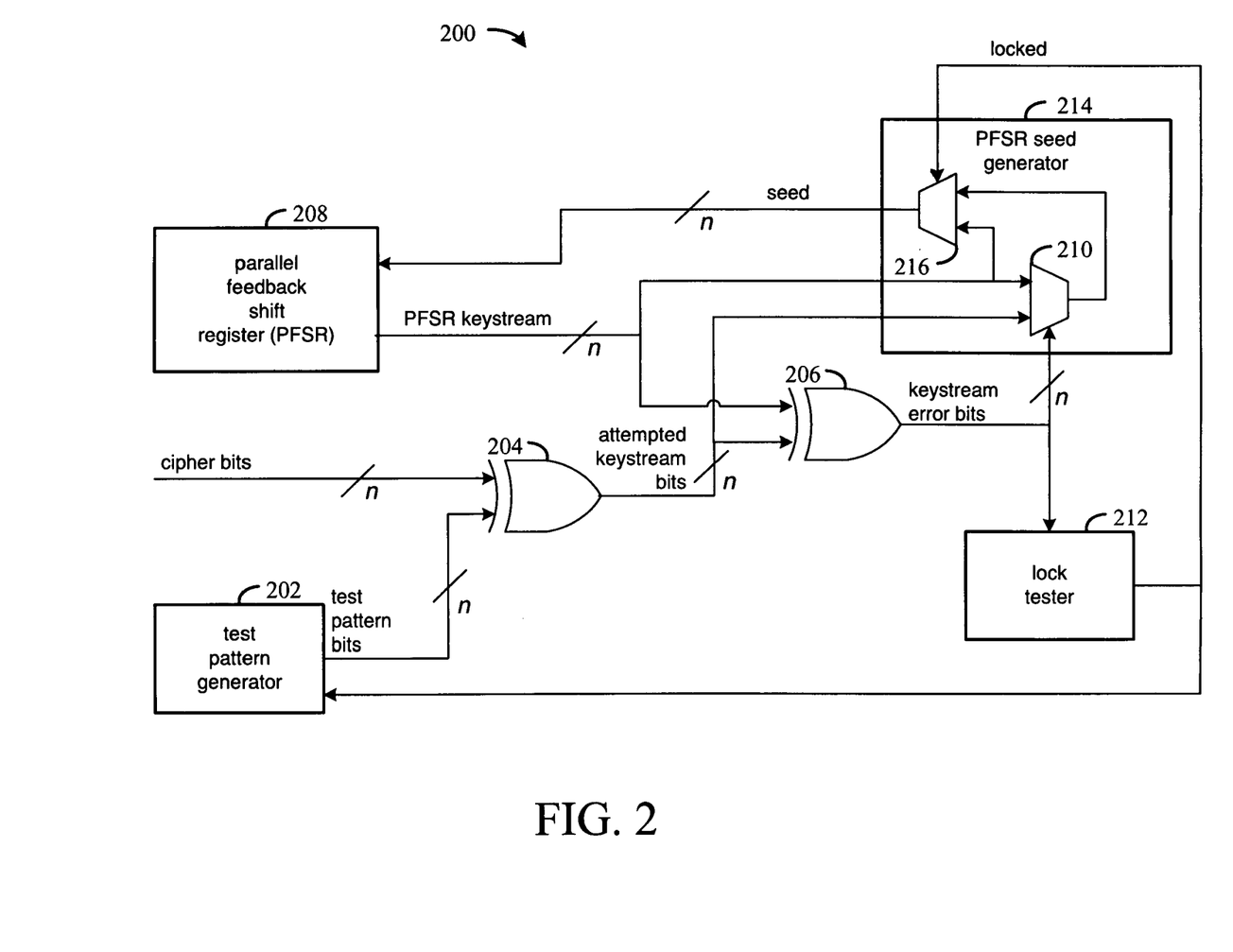
FIG. 2 is a functional block diagram of a parallel keystream decoder in accordance with various embodiments of the invention.

FIG. 2 is a functional block diagram of a parallel keystream decoder in accordance with various embodiments of the invention. The keystream decoder 200 addresses time and resource issues associated with parallel keystream decoders by reversing the decoding process. Other approaches receive input cipher text, decode the cipher text with a keystream from an LFSR, and compare the output data with all training pattern variations. The process is repeated until the decoded cipher text matches a training pattern.

The process performed by parallel keystream decoder 200 begins instead by generating a test pattern. The test pattern is compared to the input cipher bits, and the result of the comparison is XOR'd with a current keystream. If the final comparison is all 0 bits, then the keystream matches that used by the transmitter.

The operation may be alternatively explained as follows. The transmitter encodes the training pattern into cipher text by:

Tx-training-pattern XOR Tx-keystream=Cipher-text

The receiver derives the Tx-keystream as follows. The input cipher bits are XOR'd with the test pattern bits:

Cipher-text XOR Rx-test-pattern

This expression may be expanded, by replacing the Cipher-text term with its constituent terms, to:

Tx-training pattern XOR Tx-keystream XOR Rx-test-pattern

If the Rx-test-pattern term is equal to the Tx-training pattern term, the XOR'ing of these terms results in logic 0s, and XOR'ing all 0's with Tx-keystream results in Tx-keystream.

Test pattern generator 202 generates the test pattern bits. The number of test pattern bits depends on implementation requirements, and in decoder 200 the number of bits is represented as n. In an example embodiment, the test pattern generator 202 cycles through the possible permutations of test patterns. For example, a training pattern may be a low-period square wave having a 32-cycle period (16 0-value bits followed by 16 1-value bits). Depending on the timing of serial-to-parallel conversion of the training pattern, the transition from 0-value bits to 1-value bits may be at any of 32 positions in a 32-bit pattern. For example, one 32-bit training pattern may be:

00000000000000001111111111111111

Another 32-bit training pattern may be:

00001111111111111111000000000000

In one embodiment, if the training pattern is transmitted 16 bits at a time, then the decoder will cycle through all 32 possible 16-bit values of the training pattern. Each 16-bit test pattern value is checked against a current 16 bits of cipher text. Thus, the next 16 bits of cipher text are not processed until all test patterns have been checked against the current 16 bits of cipher text. Those skilled in the art will recognize, without needing illustration in FIG. 2, various alternative implementations of the logic that controls input of cipher bits. The test pattern bits are XOR'd (204) with the received cipher bits from a transmitter (not shown). The resulting bits are referenced as attempted keystream bits and are XOR'd (206) with a current keystream value, which is provided by parallel feedback shift register 208. It will be appreciated that the XOR functions 204 and 206 and multiplexers 210 and 216 would be replicated for each of the n bits, even though the replication is not illustrated.

In another embodiment, the cipher text may be feasibly checked in parallel against the possible test pattern with parallel hardware structures since there are a limited number of test pattern values.

The keystream error bits output from XOR function 206 represent differences between the attempted keystream bits and the current PFSR keystream bits. If all keystream error bits are 0, then the PFSR keystream and attempted keystream bits match, and the current PFSR keystream may be used as the seed for the next PFSR keystream value. A 0-value bit causes multiplexer 210 to select the PFSR keystream bit.

A difference between the PFSR keystream and the attempted keystream causes the multiplexer 210 to select the attempted keystream bit. The keystream error bits are also input to lock tester 212, which determines whether the PFSR 208 has locked onto the training pattern. It will be appreciated that different implementations may have training patterns of different lengths, thereby requiring different numbers of matches between the attempted keystream bits and the PFSR keystream.

Lock tester 212 signals test pattern generator 202 and PFSR seed generator 214 to indicate whether the correct keystream has been discovered. Until the keystream has been discovered, test pattern generator 202 continues to cycle through the possible keystream values. Once the keystream is discovered, the test pattern generator thereafter outputs all 0-value bits.

PFSR seed generator 214 selects a seed for feedback to the PFSR 208. As explained above, multiplexer 210 performs a first level selection of feedback bits. Multiplexer 216 performs a second level selection based on whether the decoder has locked onto the training pattern from the transmitter. Until the lock tester 212 determines the that the decoder has locked onto the training pattern, the locked signal selects at multiplexer 216 the signal output from multiplexer 210 for feedback to the PFSR 208. Once locked, the lock signal selects the current PFSR keystream for feedback to the PFSR.

Figure 3:
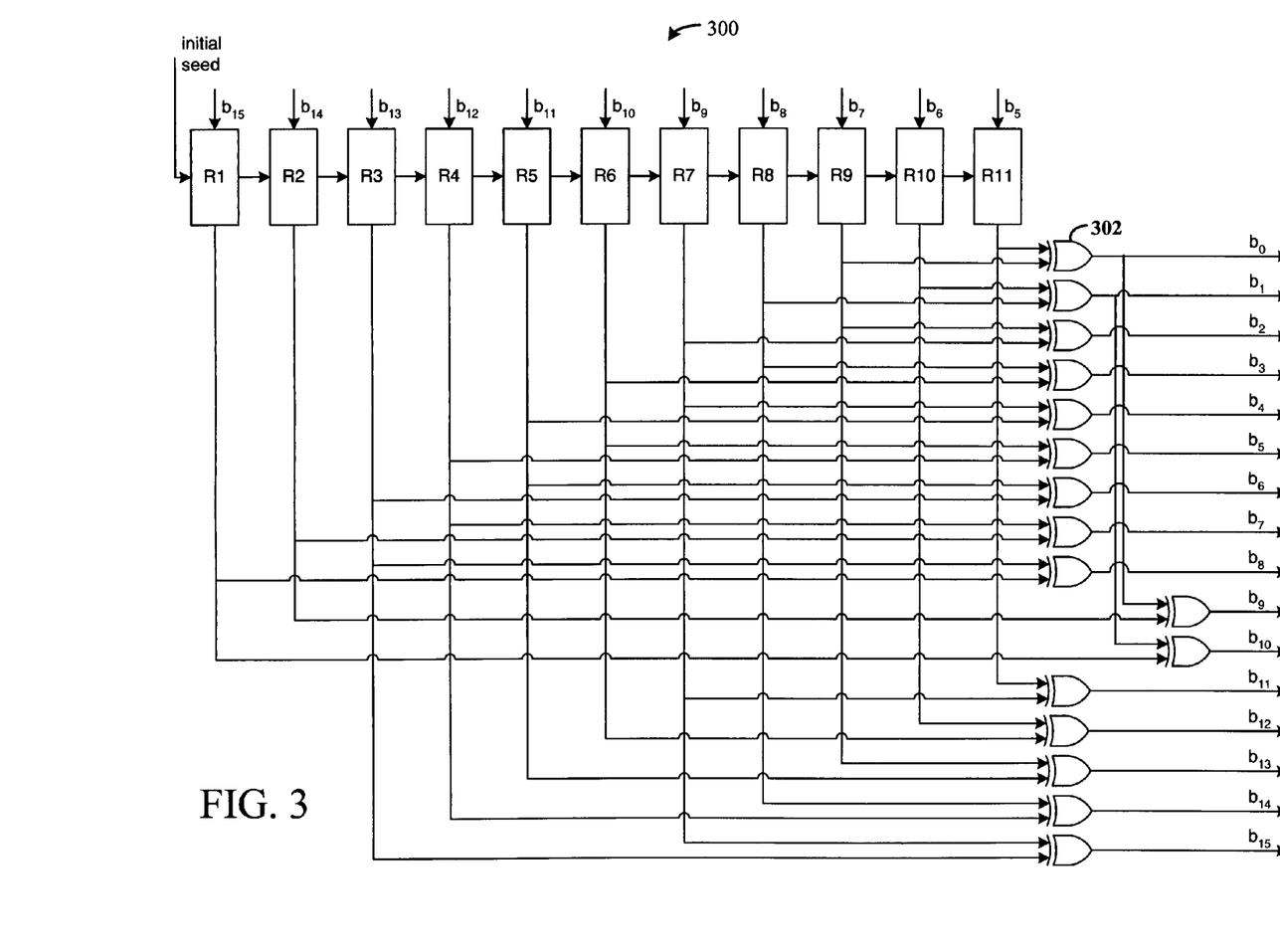
FIG. 3 illustrates an example of a parallel feedback shift register in accordance with various embodiments of the invention.

FIG. 3 illustrates an example of a parallel feedback shift register (PFSR) 300 in accordance with various embodiments of the invention. PFSR 300 is an example implementation of a parallel version of the LFSR 100 of FIG. 1. The example PFSR includes 11 registers R1–R11, from which a sixteen-bit keystream is generated in parallel. The bits of the sixteen-bit parallel keystream are referenced as $b_0$–$b_{15}$.

An initial seed may be serially shifted into the PFSR beginning at R1 and shifting right to R11. It will be appreciated that the initial seed is provided as the starting value of the PFSR.

The PFSR may be derived by mapping the cycle-by-cycle results of the LFSR to output bits of the PFSR and exercising the combinational logic simultaneously. This results in a new, pseudo-random keystream with every clock cycle. The structure of PFSR 300 also requires fewer device and clock resources than other structures that use an LFSR in combination with a serial-to-parallel converter.

The mapping of the LFSR 100 to a 16-bit parallel implementation is illustrated in Table 1 below.

In the serial LFSR one bit of the keystream is output with each clock cycle, the output bit is fed back to register R1, and the contents of registers R2–R10 are shifted right. The logical designation in the out column of the 16 bits of the keystream may be used to derive a parallel implementation of the LFSR. Instead of taking 16 clock cycles to generate a 16-bit keystream, the keystream may be generated in a single cycle.

The expressions in the out column correspond to the XOR gates in the PFSR 300 of FIG. 3. For example, the output bit 0 is S9 xor S11, which corresponds to XOR gate 302. Similar correspondences may be observed for the remaining bits 1–15.

It will be appreciated that row 16 in the table indicates the input values to be fed back to R1–R11 in the parallel implementation. For example, the next value of R1 is P=G xor E, which equals S7 xor S3, which is output bit 15. Thus, PFSR 300 illustrates that bit $b_{15}$ is input to register R1 for generating the next keystream bits. Similarly, bits $b_5$ through $b_{14}$ are input to registers R11–R2, respectively.

Figure 4A:
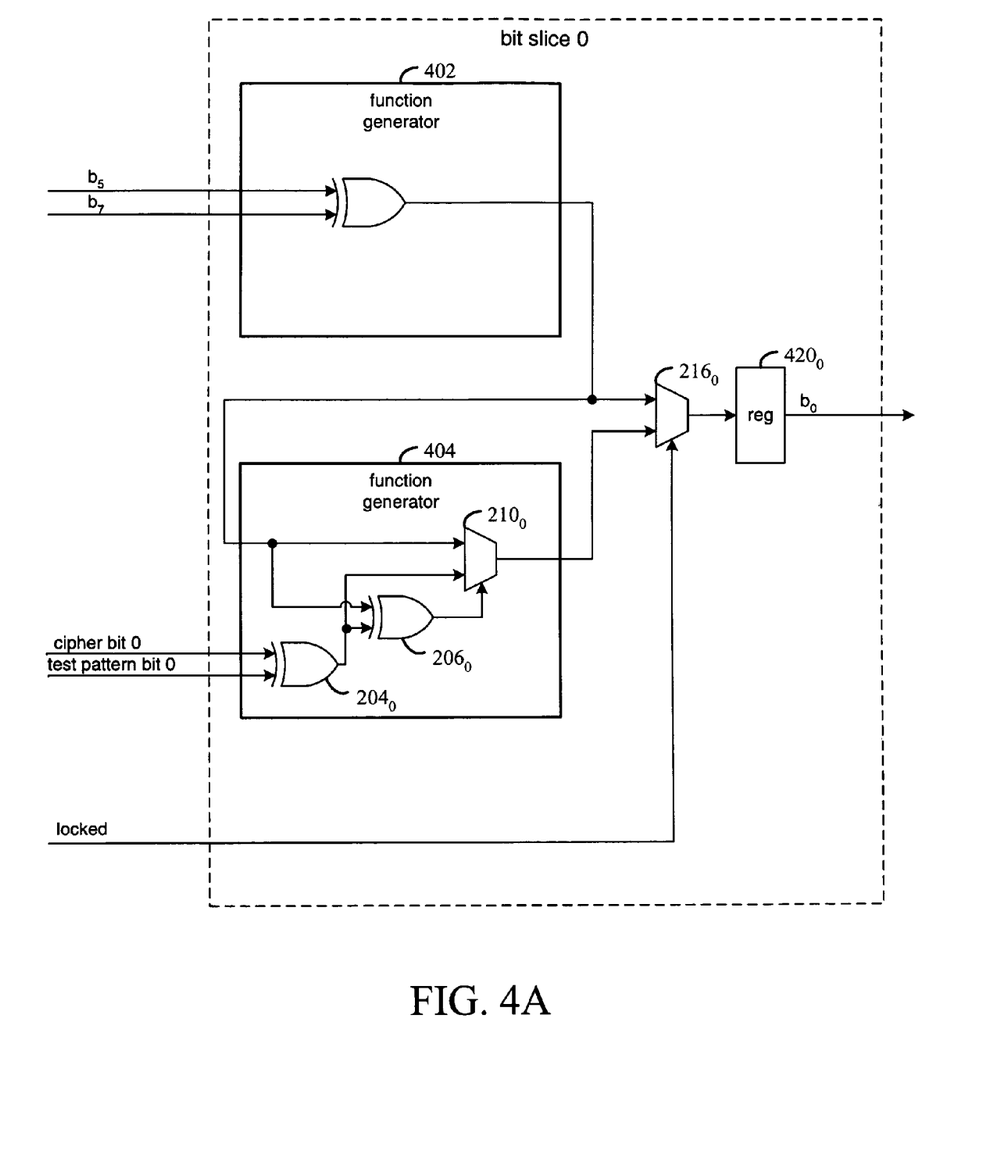
FIGS. 4A, 4B, and 4C illustrate bit slices 0, 9, and 15 of an example of a 16-bit parallel feedback shift register and keystream decoder in accordance with various embodiments of the invention.
Figure 4B:
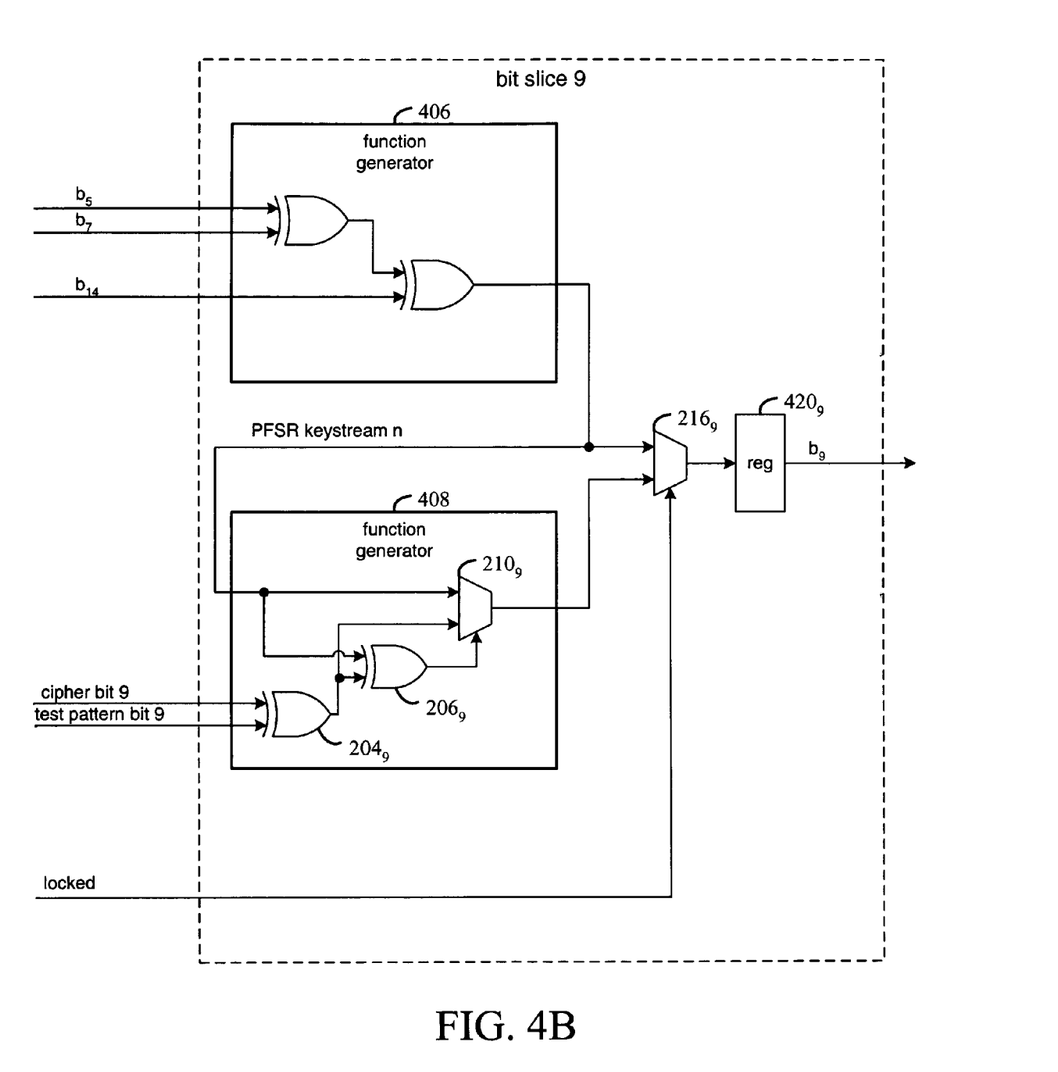
Figure 4C:
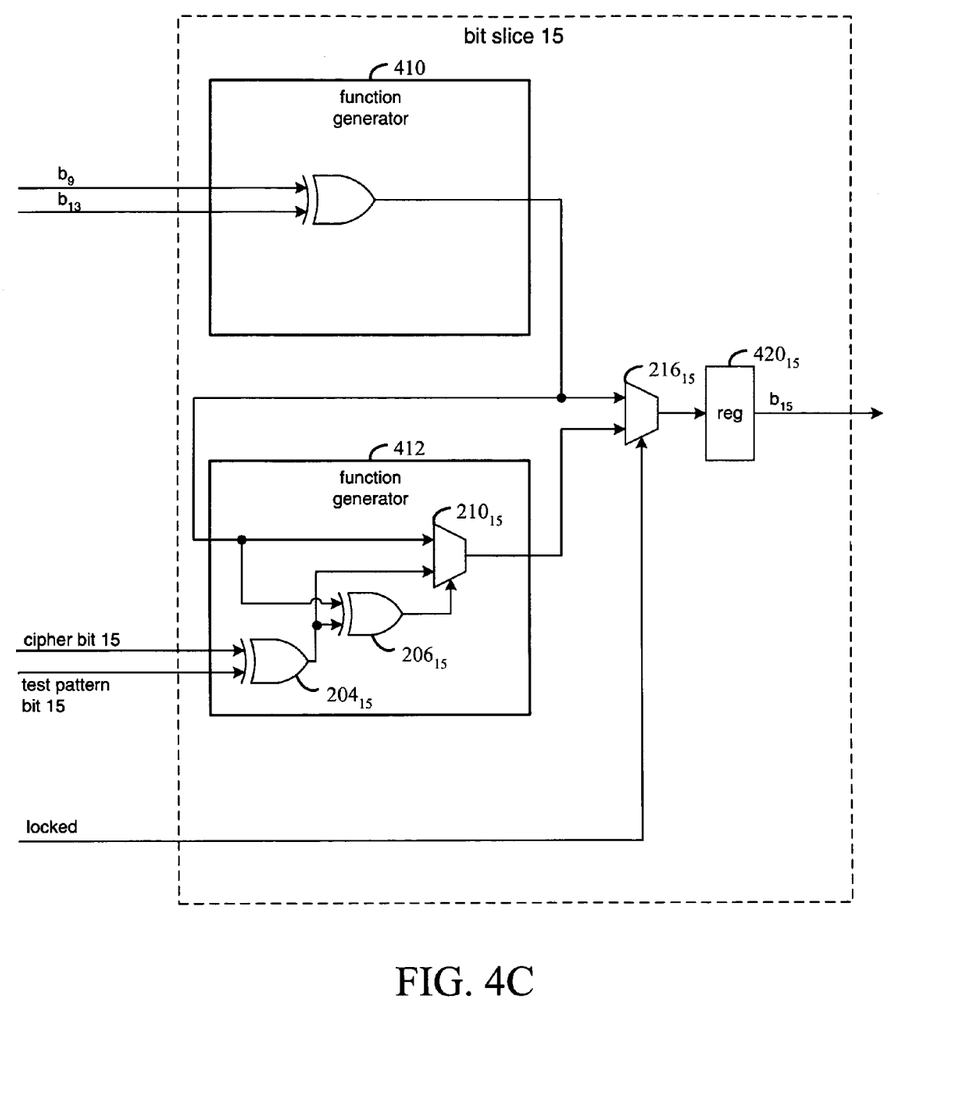

FIGS. 4A, 4B, and 4C illustrate bit slices 0, 9, and 15 of an example of a 16-bit parallel feedback shift register and keystream decoder in accordance with various embodiments

TABLE 1

| bit | R1 | R2 | R3 | R4 | R5 | R6 | R7 | R8 | R9 | R10 | R11 | out |
|---|---|---|---|---|---|---|---|---|---|---|---|---|
| 0 | S1 | S2 | S3 | S4 | S5 | S6 | S7 | S8 | S9 | S10 | S11 | S9 xor S11 |
| 1 | A = S9 xor S11 | S1 | S2 | S3 | S4 | S5 | S6 | S7 | S8 | S9 | S10 | S8 xor S10 |
| 2 | B = S8 xor S10 | A | S1 | S2 | S3 | S4 | S5 | S6 | S7 | S8 | S9 | S7 xor S9 |
| 3 | C = S7 xor S9 | B | A | S1 | S2 | S3 | S4 | S5 | S6 | S7 | S8 | S6 xor S8 |
| 4 | D = S6 xor S8 | C | B | A | S1 | S2 | S3 | S4 | S5 | S6 | S7 | S5 xor S7 |
| 5 | E = S5 xor S7 | D | C | B | A | S1 | S2 | S3 | S4 | S5 | S6 | S4 xor S6 |
| 6 | F = S4 xor S6 | E | D | C | B | A | S1 | S2 | S3 | S4 | S5 | S3 xor S5 |
| 7 | G = S3 xor S5 | F | E | D | C | B | A | S1 | S2 | S3 | S4 | S2 xor S4 |
| 8 | H = S2 xor S4 | G | F | E | D | C | B | A | S1 | S2 | S3 | S1 xor S3 |
| 9 | I = S1 xor S3 | H | G | F | E | D | C | B | A | S1 | S2 | A xor S2 = S9 xor S11 xor S2 |
| 10 | J = A xor S2 | I | H | G | F | E | D | C | B | A | S1 | B xor S1 = S8 xor S10 xor S1 |
| 11 | K = B xor S1 | J | I | H | G | F | E | D | C | B | A | C xor A = S11 xor S7 |
| 12 | L = C xor A | K | J | I | H | G | F | E | D | C | B | D xor B = S10 xor S6 |
| 13 | M = D xor B | L | K | J | I | H | G | F | E | D | C | E xor C = S9 xor S5 |
| 14 | N = E xor C | M | L | K | J | I | H | G | F | E | D | F xor D = S8 xor S4 |
| 15 | = F xor D | N | M | L | K | J | I | H | G | F | E | G xor E = S7 xor S3 |
| 16 | P = G xor E | O | N | M | L | K | J | I | H | G | F | H xor F = S6 xor S2 |

The column headings R1–R11 represent the 11 registers with cells below the registers indicating the contents of the registers at various cycles in serially generating a 16-bit keystream. For example, registers R1–R11 initially have values S1–S11, respectively. The bit column indicates the position of the bit in the output keystream, and the output value is that indicated in the out column. For example, bit 0 of the keystream is S9 xor S11, which corresponds to the XOR'ing of the contents of R9 and R11 from LFSR 100 of FIG. 1.

For bits 11–15, the reduction of the output expressions should be noted. For bit 11, the output bit may be expressed as C xor A, which may be expanded to S7 xor S9 xor S9 xor S11. In evaluating this expression it is assumed that the S9 xor S9 portion evaluates to a 0 bit, leaving S7 xor S11 as the expression of the output bit. Similar reductions are made for bits 12–15.

The output value is fed back as the input value to the R1 register (Table 1). For example, the value of R1 becomes the value, S9 xor S11. Further, the contents of registers R1–R10 are shifted right for generating keystream bit 1, as can be seen in the rows for bits 0 and 1.

of the invention. The example arrangement further illustrates an example implementation of the decoder 200 of FIG. 2, which includes the PFSR 300 of FIG. 3. The arrangement of FIGS. 4A–C continues with the example involving a 16-bit keystream and an 11-register PFSR.

The example embodiments are implemented on resources of a field programmable gate array (FPGA), such as the Virtex line of FPGAs from Xilinx. It will be appreciated that various other programmable logic devices having comparable programmable resources could be alternatively used.

The implementation assumes that the FPGA has 4-input function generators that are programmable to implement the illustrated logic. Generally for each bit, one function generator implements the logic associated with generating a PFSR output bit, and another function generator implements the logic associated with decoding a keystream. For example, in bit slice 0 function generator 402 implements the logic that generates bit 0 from a PFSR (e.g., PFSR 208 of FIG. 2), and function generator 404 implements the decoder logic associated with bit 0 of input cipher bits and bit 0 of the test pattern bits. Similarly, function generator 406 implements the logic that generates bit 9 from a PFSR, and function generator 408 implements the decoder logic associated with bit 9 of the cipher bits and test pattern bits. Function generators 410 and 412 fulfill similar roles for bits 15 of the PFSR, cipher bits, and test pattern bits.

While the PFSR keystream is 16 bits long, only 11 of those bits are fed back as the seed for the next 16 bits of the keystream. The 11 bits correspond to the feedback inputs to the 11 registers of the PFSR 300 of FIG. 3. Specifically, bits 5–15 are fed back (see Table 1 and FIG. 3).

From FIG. 3 and Table 1, it may be observed that the bits used to generate bit 0 from function generator 402 are bits 5 and 7 (FIG. 3, registers R9 and R11, and XOR gate 302). Similar observations may be made of function generators 406 and 410 that generate PFSR bits 9 and 15.

Function generators 404, 408, and 412 implement the functions that correspond to comparison of test pattern bits to input cipher bits (FIG. 2, 204), comparison of those results with the PFSR bits (206), and selection of either the attempted keystream bits or the PFSR keystream bits (210). For example, the correspondence in function generator 404 may be seen as XOR function $204_0$ implementing the XOR function 204 for bits 0 of the cipher bits and test pattern bits. Similarly, XOR function $206_0$ implements the XOR function 206 for bit 0. Similar correspondences may be seen with XOR functions $204_9$, $206_9$, $204_{15}$, and $206_{15}$.

Multiplexer functions $210_0$, $210_9$, $210_{15}$ and $216_0$, $216_9$, and $216_{15}$ correspond to the multiplexer functions 210 and 216 described in FIG. 2.

Additional FPGA resources may be employed to implement the multiplexers $216_0$, $216_9$, and $216_{15}$ and registers $420_0$, $420_9$, and $420_{15}$. For example, the Virtex line of FPGAs includes registers that are associated with the function generators and multiplexers that are programmable to select between output from the function generators. Additionally, the registers may be configured to default to either a 0-value bit or a 1-value bit at power-on of the device. It will be appreciated that any initial state may be used, except for the initial seed value being all 0-value bits.

The present invention is believed to be applicable to a variety of circuit arrangements for decoding keystreams and has been found to be particularly applicable and beneficial in FPGA-based implementations. Other aspects and embodiments of the present invention will be apparent to those skilled in the art from consideration of the specification and practice of the invention disclosed herein. It is intended that the specification and illustrated embodiments be considered as examples only, with a true scope and sprit of the invention being indicated by the following claims.

What is claimed is:

1. A method for decoding a keystream, comprising:
   receiving a set of cipher bits;
   generating a set of test bits;
   generating a set of attempted keystream bits from differences between the test bits and the cipher bits;
   generating, from a current seed, a set of current keystream bits from a parallel feedback shift register;
   comparing the attempted keystream bits to the current keystream bits;
   feeding back the current keystream bits as a new current seed in response to attempted keystream bits that equal the current keystream bits; and
   feeding back the attempted keystream bits as a new current seed in response to attempted keystream bits that do not equal the current keystream bits.

2. The method of claim 1, wherein the step of generating a set of current keystream bits includes generating the bits from a first set of function generators of a field programmable gate array (FPGA).

3. The method of claim 2, wherein the step of generating the attempted keystream bits and the step of comparing are performed on a second set of function generators of an FPGA.

4. The method of claim 3, wherein the step of generating a set of attempted keystream bits from differences between the test bits and the cipher bits includes applying an exclusive-or function to each bit of the test bits and a corresponding bit of the cipher bits.

5. The method of claim 4, wherein the step of comparing the attempted keystream bits to the current keystream bits includes applying an exclusive-or function to each bit of the attempted keystream bits and a corresponding bit of the current keystream bits.

6. The method of claim 1, further comprising signaling that the keystream is decoded in response to the attempted keystream bits being equal to the current keystream bits.

7. A method for decoding a keystream, comprising:
   (a) receiving a set of cipher bits;
   (b) generating a current set of test bits;
   (c) generating a set of attempted keystream bits from differences between the current set of test bits and the cipher bits;
   (d) generating, from a current seed, a set of current keystream bits from a parallel feedback shift register;
   (e) comparing the attempted keystream bits to the current keystream bits;
   (f) feeding back the current keystream bits as a new current seed in response to attempted keystream bits that equal the current keystream bits;
   (g) feeding back the attempted keystream bits as a new current seed in response to attempted keystream bits that do not equal the current keystream bits;
   (h) signaling that the keystream is decoded in response to the attempted keystream bits being equal to the current keystream bits;
   (i) in response to the attempted keystream bits being not equal to the current keystream bits,
   (j) generating a new current set of test bits, the new current set of test bits being one of a plurality of sets of test bits, wherein no two sets of test bits have identical bit values;
   (k) repeating steps (a)–(j) until each of the plurality of sets of test bits has been generated; and
   (l) in response to the attempted keystream bits being not equal to the current keystream bits and having generated each of the plurality of sets of test bits,
   (m) receiving a new plurality of cipher bits; and
   (n) repeating steps (a)–(m) until the attempted keystream bits are equal to the current keystream bits.

8. The method of claim 7, wherein the step of generating a set of current keystream bits includes generating the bits from a first set of function generators of a field programmable gate array (FPGA).

9. The method of claim 8, wherein the step of generating the attempted keystream bits and the step of comparing are performed on a second set of function generators of an FPGA.

10. The method of claim 9, wherein the step of generating a set of attempted keystream bits from differences between the test bits and the cipher bits includes applying an exclusive-or function to each bit of the test bits and a corresponding bit of the cipher bits.

11. The method of claim 10, wherein the step of comparing the attempted keystream bits to the current keystream bits includes applying an exclusive-or function to each bit of the attempted keystream bits and a corresponding bit of the current keystream bits.

12. A parallel keystream decoder, comprising:
a first circuit configured to generate a set of test bits;
a second circuit coupled to the first circuit, the second circuit configured to generate a set of attempted keystream bits from differences between the test bits and an input set of cipher bits;
a parallel feedback shift register (PFSR) configured to generate, from a current seed, a set of current keystream bits;
a third circuit coupled to the PFSR and to the second circuit, the third circuit configured to compare the attempted keystream bits to the current keystream bits; and
a fourth circuit coupled to the third circuit, the fourth circuit configured to feed back the current keystream bits as a new current seed in response to attempted keystream bits that equal the current keystream bits, and feed back the attempted keystream bits as a new current seed in response to attempted keystream bits that do not equal the current keystream bits.

13. The decoder of claim 12, wherein the parallel feedback shift register is configured in a first set of function generators of a field programmable gate array (FPGA).

14. The decoder of claim 13, wherein the second third circuits are configured in a second set of function generators of an FPGA.

15. The decoder of claim 14, wherein the second set of function generators are configured to implement exclusive-or functions between the test bits and the cipher bits.

16. The decoder of claim 15, wherein the second set of function generators are configured to implement exclusive-or functions between the attempted keystream bits and the current keystream bits.

17. The decoder of claim 12, further comprising a fifth circuit coupled to third circuit, the fifth circuit configured to signal that the keystream is decoded in response to the attempted keystream bits being equal to the current keystream bits.

18. An n-bit parallel feedback shift register, wherein n is greater than 3, comprising:
n single-bit registers in a field programmable gate array (FPGA); and
n function generators in the FPGA, each function generator having an output port coupled to a respective one of the registers and a plurality of input ports coupled to output ports of at least two of the registers, wherein each function generator is configured to apply an exclusive-or function to signals at the input ports, and each register is updated with a new state in response to output from the coupled function generator.

* * * * *